March 28, 1944. G. L. CLAYBOURN 2,345,033
METAL-CLAD SWITCHGEAR
Filed Feb. 13, 1942 6 Sheets-Sheet 1

WITNESSES:
E.A. McCloskey
M.S. Elliott

INVENTOR
Glen L. Claybourn.
BY M. Crawford
ATTORNEY

March 28, 1944.　　　G. L. CLAYBOURN　　　2,345,033
METAL-CLAD SWITCHGEAR
Filed Feb. 13, 1942　　　6 Sheets-Sheet 2

WITNESSES:　　　INVENTOR
　　　Glen L. Claybourn.
　　　ATTORNEY

March 28, 1944. G. L. CLAYBOURN 2,345,033
METAL-CLAD SWITCHGEAR
Filed Feb. 13, 1942 6 Sheets-Sheet 4

WITNESSES:

INVENTOR
Glen L. Claybourn.
ATTORNEY

March 28, 1944. G. L. CLAYBOURN 2,345,033
METAL-CLAD SWITCHGEAR
Filed Feb. 13, 1942 6 Sheets-Sheet 5

WITNESSES:

INVENTOR
Glen L. Claybourn.
BY
ATTORNEY

March 28, 1944.    G. L. CLAYBOURN    2,345,033
METAL-CLAD SWITCHGEAR
Filed Feb. 13, 1942    6 Sheets-Sheet 6
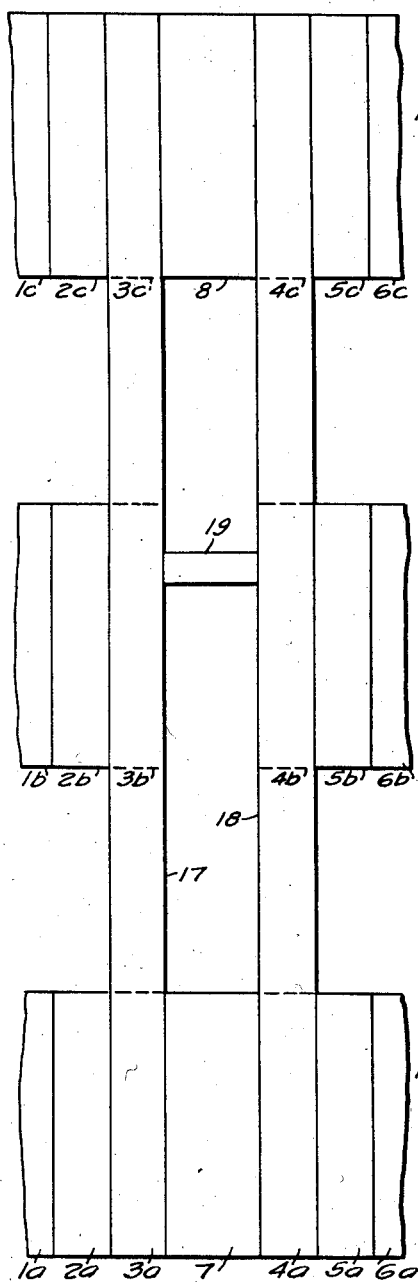
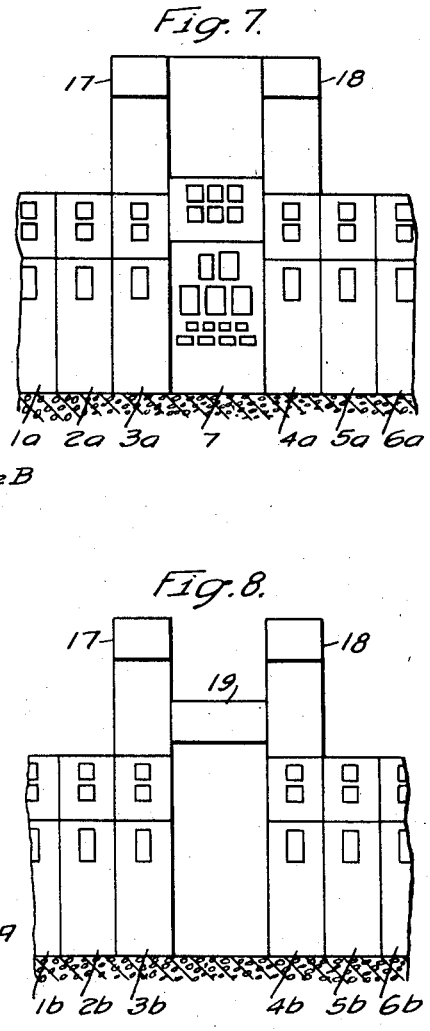
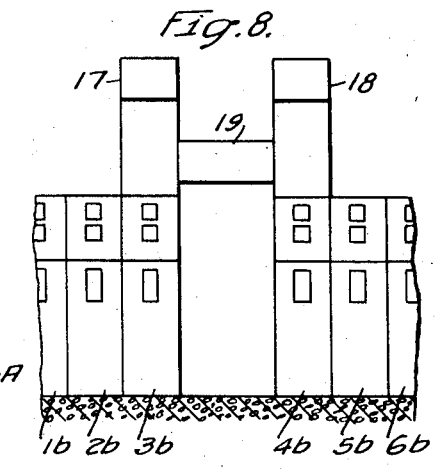
INVENTOR
Glen L. Claybourn.
BY
ATTORNEY Patented Mar. 28, 1944

2,345,033

UNITED STATES PATENT OFFICE 2,345,033

METAL-CLAD SWITCHGEAR

Glen L. Claybourn, Pittsburgh, Pa., assignor to Westinghouse Electric & Manufacturing Company, East Pittsburgh, Pa., a corporation of Pennsylvania Application February 13, 1942, Serial No. 430,703

15 Claims. (Cl. 175—298)

My invention relates, generally, to metal-clad switchgear and, more particularly, to metal-clad switchgear of the vertical lift type.

In electric power systems, it is customary to provide substations, the function of which is to subdivide the electrical energy supplied thereto for distribution to the consumers. In such stations, switching equipment is required to connect and disconnect the incoming line and the outgoing feeders to the main bus and to protect the connected apparatus from damage as a result of fault conditions. Voltage regulation is usually required to maintain a desired voltage on the feeder circuits. An induction regulator is usually provided for each feeder circuit. A transfer bus is usually provided to permit the automatic circuit breakers and the induction regulators to be taken out of service without interrupting the power supply to the feeder circuits. Previous stations of this type have been complicated in structure and have required a large amount of space.

An object of my invention, generally stated, is to provide metal-clad switchgear which shall be simple and efficient in operation and which may be economically manufactured and installed.

A more specific object of my invention is to provide metal-clad switchgear which may be utilized in a three-phase distribution system having single-phase voltage regulated feeder circuits.

Another object of my invention is to provide for flexible selective control of the feeder circuits.

A further object of my invention is to provide metal-clad switchgear in which all of the equipment is accessible for maintenance and repair.

Still another object of my invention is to reduce the floor space required for metal-clad switchgear.

Other objects of my invention will be explained fully hereinafter or will be apparent to those skilled in the art.

In accordance with one embodiment of my invention, the metal-clad switchgear for controlling a plurality of feeder circuits comprises two three-phase bus runs, energized from either or both ends by an incoming supply. The segregated single phase feeder metal-clad groups are disposed at right angles to the main buses, with half of each single-phase feeder group on either side of the main buses. Each phase of each main bus energizes its respective half of each single phase feeder group. The single-phase feeder groups are equipped with a main and transfer bus, circuit breaker, selector disconnect switches and instrument transformers. The transfer bus extends the full length of the feeder group, thereby permitting transfer of energy to the feeders on either half of the group.

For a fuller understanding of the nature and objects of my invention, reference may be had to the following detailed description, taken in conjunction with the accompanying drawings, in which:

Fig. 6 is a view, in plan, showing the general arrangement of the switchgear apparatus for the three-phase system illustrated in Fig. 1;

Fig. 7 is a view, in elevation, of the apparatus for either phase A or phase C; and Fig. 8 is a view, in elevation, of the apparatus for phase B.

Figure 1:
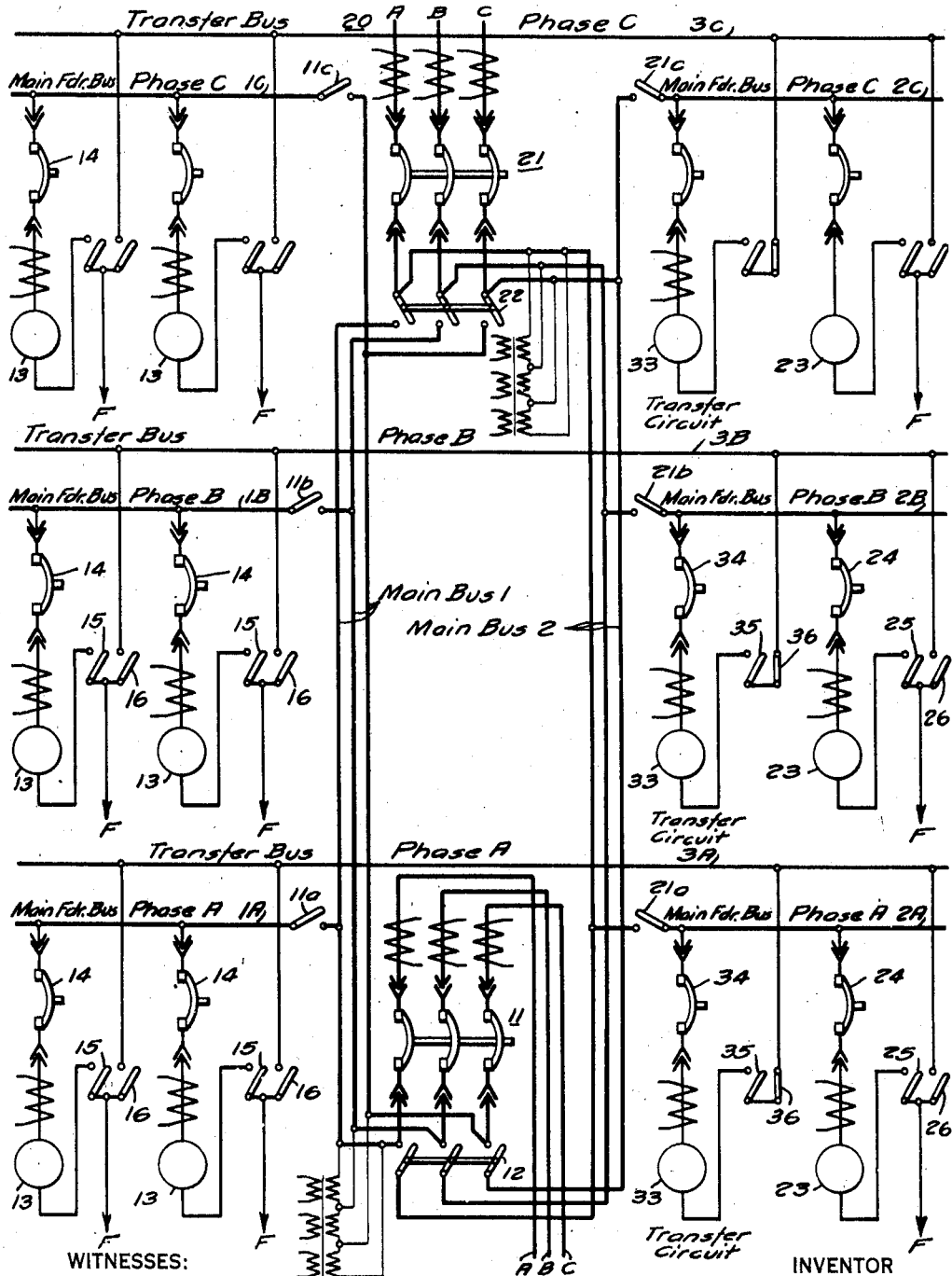
Figure 1 is a diagrammatic view of the circuits for a power distribution system utilizing metal-clad switchgear of the type provided by an invention.
Figure 2:
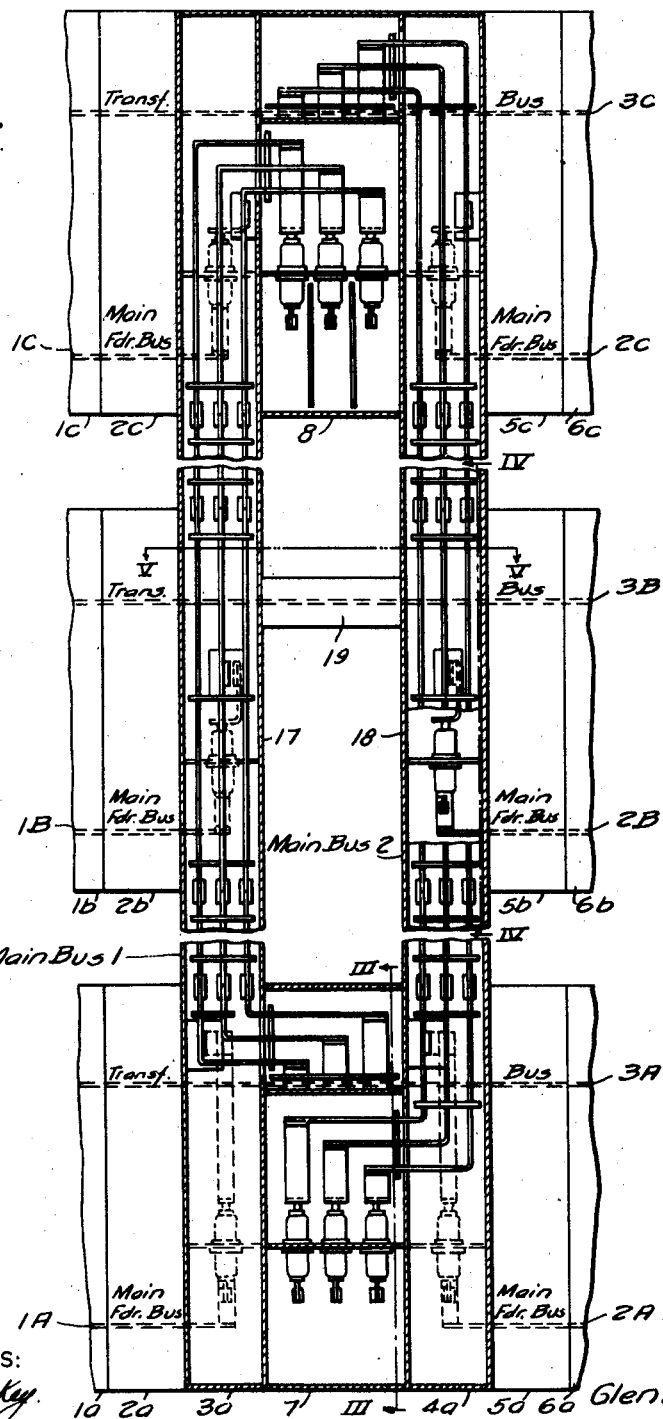
Fig. 2 is a sectional plan view of a portion of the switchgear apparatus for the system illustrated in Fig. 1.

Referring to the drawings, and particularly to Fig. 1, the system shown therein comprises a pair of three-phase main buses 1 and 2, two three-phase incoming lines 10 and 20, a three-pole circuit breaker 11 for connecting the line 10 to the main bus 1 and a three-pole circuit breaker 21 for connecting the line 20 to the main bus 2. As shown, a pair of three-pole disconnecting switches 12 and 22 are provided for connecting the main buses 1 and 2 together to form a closed loop, if desired. Thus, the main buses 1 and 2 may be energized from either one or both of the incoming lines 10 and 20.

A plurality of single-phase feeder circuits F are provided for each phase of the three-phase buses. The feeder circuits F are energized from a main feeder bus for each phase which is disposed at right angles to the main bus and may be connected to the corresponding phase by means of disconnecting switches such as 11a, 11b and 11c or 21a, 21b and 21c. Thus, the main feeder bus for each phase is divided into two sections, such as 1A and 2A, one of which may be connected to the proper phase of the main bus 1 and the other of which may be connected to the proper phase of the main bus 2. In this manner, approximately half of the feeder circuits are energized from each one of the main buses. A transfer bus, such as 3A, 3B and 3C is provided for each phase. As shown, the transfer buses are also disposed at right angles to the main buses and extend the full width of the switchgear structure.

Each feeder circuit may be connected to one of the main feeder buses through an induction regulator, thereby maintaining a desired voltage on the feeder circuit. Thus, each one of the feeder circuits for the section of the main feeder bus which is energized from the main bus 1 may be connected to the proper phase of the main feeder bus by means of a single pole circuit breaker 14, which connects an induction regulator 13 to the main feeder bus and a single pole disconnecting switch 15 which connects the regulator 13 to the feeder circuit.

As explained hereinbefore, if it is necessary to take a regulator 13 or a circuit breaker 14 out of service, the feeder circuit may be connected to the transfer bus for the corresponding phase by means of a single pole disconnecting switch 16.

Likewise, the feeder circuits for the sections of the main feeder buses which are energized from each phase of the main bus 2 are provided with induction regulators 23 which are connected in the feeder circuits by means of single pole circuit breakers 24 and single pole disconnecting switches 25. The feeder circuits may be transferred to the proper transfer bus by means of single pole disconnecting switches 26.

In order that a regulated voltage may be maintained on each one of the feeder circuits when they are connected to the transfer bus, induction regulators 33 are provided for the transfer bus for each phase. Thus, the transfer bus for each phase may be connected to the main feeder bus for that phase by means of a single pole circuit breaker 34 which connects the induction regulator 33 to the main feeder bus and a single pole disconnecting switch 35 which connects the induction regulator to the transfer bus through a fixed conductor 36 that may be utilized in place of the disconnecting switches 16 or 26 of the corresponding feeder circuits.

As shown in Figs. 2 to 8, the bus structures and the switching apparatus necessary for performing the switching operations required for controlling the feeder circuits are all enclosed in metal housings. Individual switchgear units are provided for each feeder circuit. An individual unit is also provided for each one of the incoming lines 10 and 20, and the main buses 1 and 2 are each enclosed in an individual metal housing.

As shown in Figs. 2, 6, 7 and 8, the segregated single phase feeder metal-clad groups for each phase are disposed at right angles to the main bus with half of each single phase feeder group on either side of the main buses. Thus, switchgear units 1a to 6a, inclusive, are provided for the feeder circuits for phase A, units 1b to 6b, inclusive, are provided for the feeder circuits for phase B and the units 1c to 6c are provided for phase C.

As shown, units 1a, 2a and 3a are disposed on one side of the incoming line unit 7 and units 4a, 5a, 6a are disposed on the other side of the incoming line unit 7. Likewise units 1c, 2c and 3c are on one side of the incoming line unit 8, while units 4c, 5c and 6c are on the other side of the unit 8. The main bus 1 is enclosed in a horizontal housing 17 which is supported by the units 3a, 3b and 3c and the main bus 2 is enclosed in a housing 18 which is supported by the units 4a, 4b and 4c.

Figure 5:
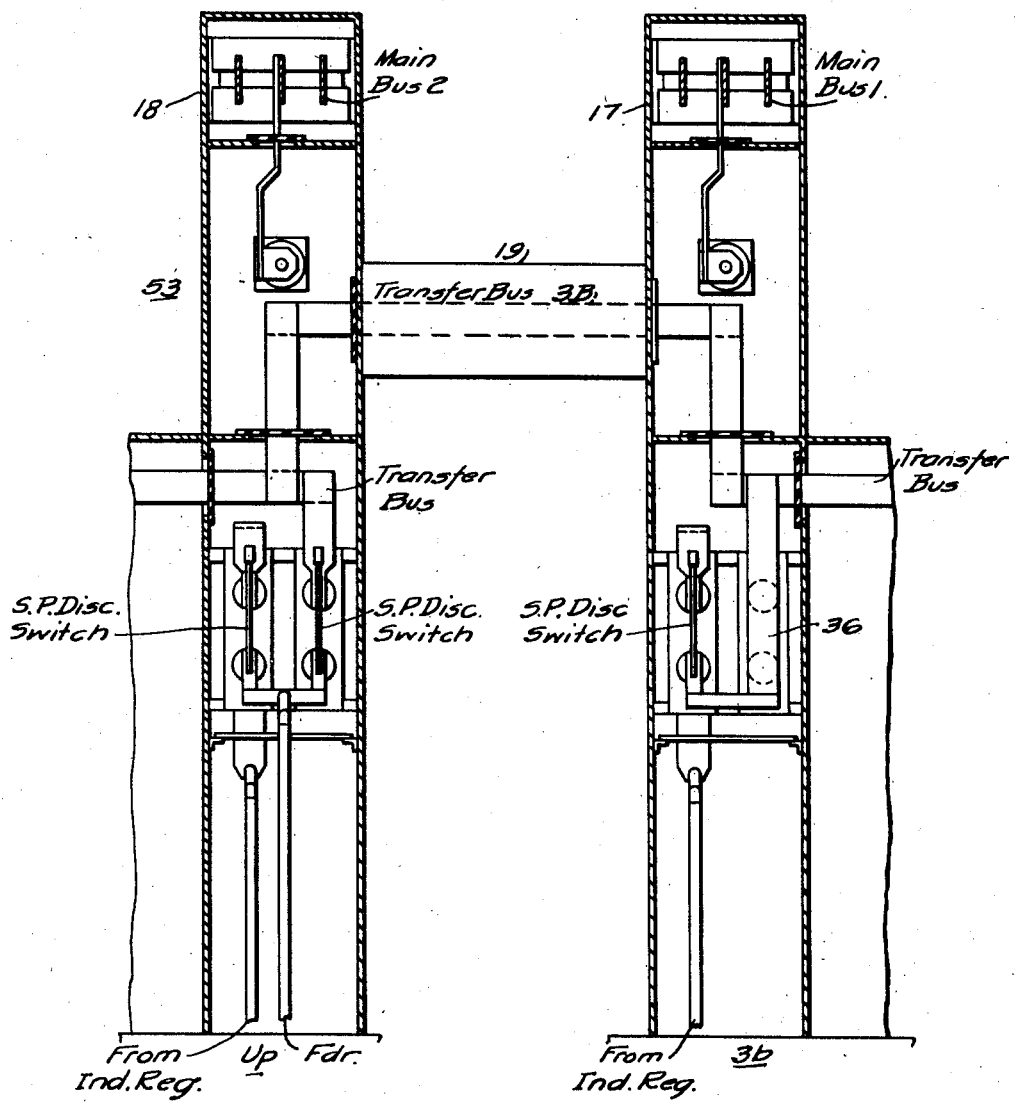
Fig. 5 is an enlarged view, in section, taken along the line V—V of Fig. 2.

As shown in Figs. 5, 6 and 8, the transfer bus for phase B is enclosed by a housing 19 in the space between the units 3b and 4b since no switchgear unit is provided in this space. The transfer buses for phases A and C are disposed in the switchgear units 7 and 8, respectively, the structure of which will be more fully described hereinafter.

Figure 3:
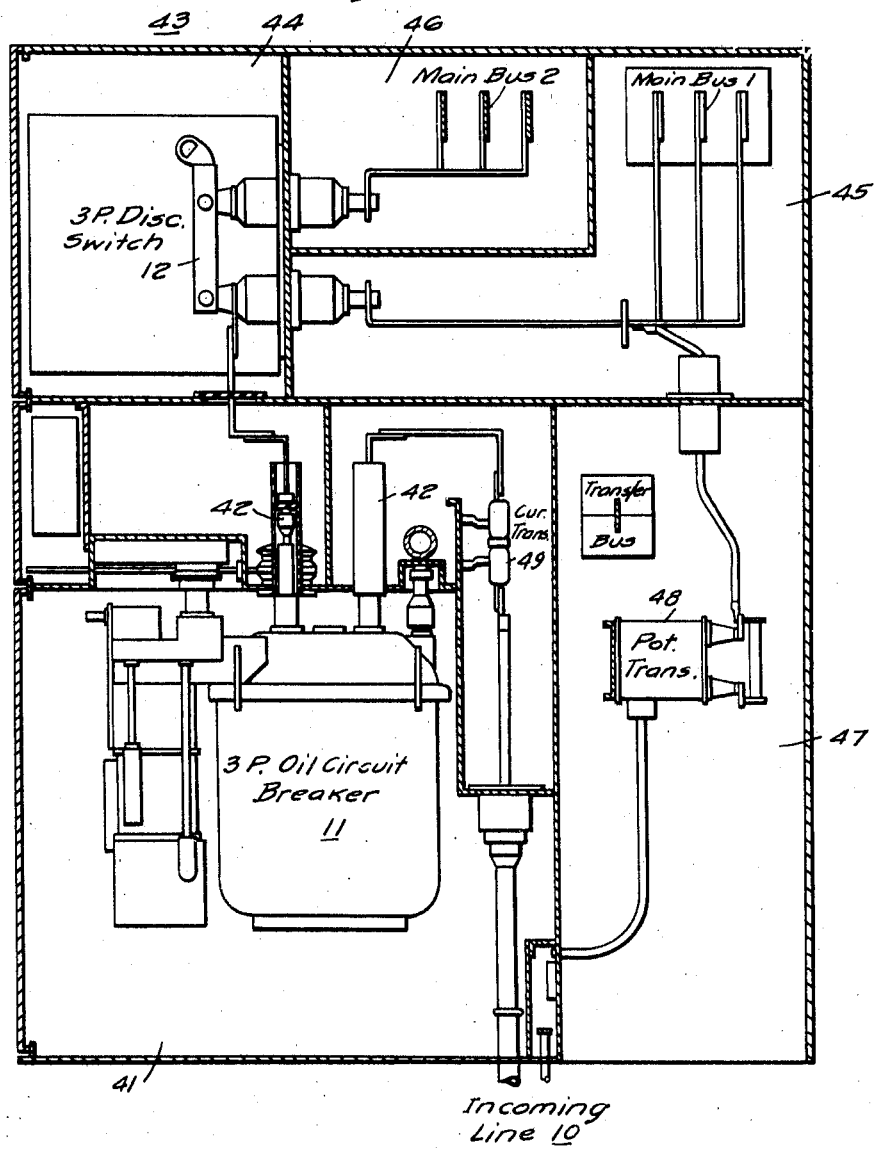
Fig. 3 is an enlarged view, in section, taken along the line III—III of Fig. 2, and illustrating one of the incoming line breaker units.

The switchgear unit illustrated in Fig. 3 is typical for the incoming line units 7 and 8. The structure shown comprises the three-pole oil circuit breaker 11 which may be of the vertical lift type and is enclosed in a compartment 41. The circuit breaker is provided with disconnecting contacts 42 for disconnecting the breaker when it is lowered to a position for withdrawal from the cell in a manner well known in the art.

The three-pole disconnecting switch 12 and portions of the main buses 1 and 2 are located in a superstructure 43 disposed above the circuit breaker housing. The superstructure 43 is in turn divided into a compartment 44 for the disconnect switch 12, a compartment 45 for the main bus 1 and a compartment 46 for the main bus 2, thereby completely isolating the bus structures. A compartment 47 is provided at the rear of the circuit breaker compartment 41 for the transfer bus. Potential transformers 48, which are connected to the main bus 1, are also mounted in the compartment 47. Current transformers 49 are provided for each phase of the incoming line 10.

By comparing the diagram in Fig. 1 with the structure shown in Fig. 3, it will be seen that the incoming line 10 is connected with one terminal of the circuit breaker 11 and the other terminal of the circuit breaker is connected to one terminal of the disconnecting switch 12 and also to the main bus 1. The other terminal of the disconnecting switch 12 is connected to the main bus 2. Thus, by closing the disconnecting switch 12, the incoming line 10 may be connected to both buses.

As explained hereinbefore, the structure shown in Fig. 3 is typical for each one of the incoming line switchgear units and the unit 8 is similar in structure to that shown in Fig. 3. Therefore, it is believed to be unnecessary to describe the structure of the unit 8.

Figure 4:
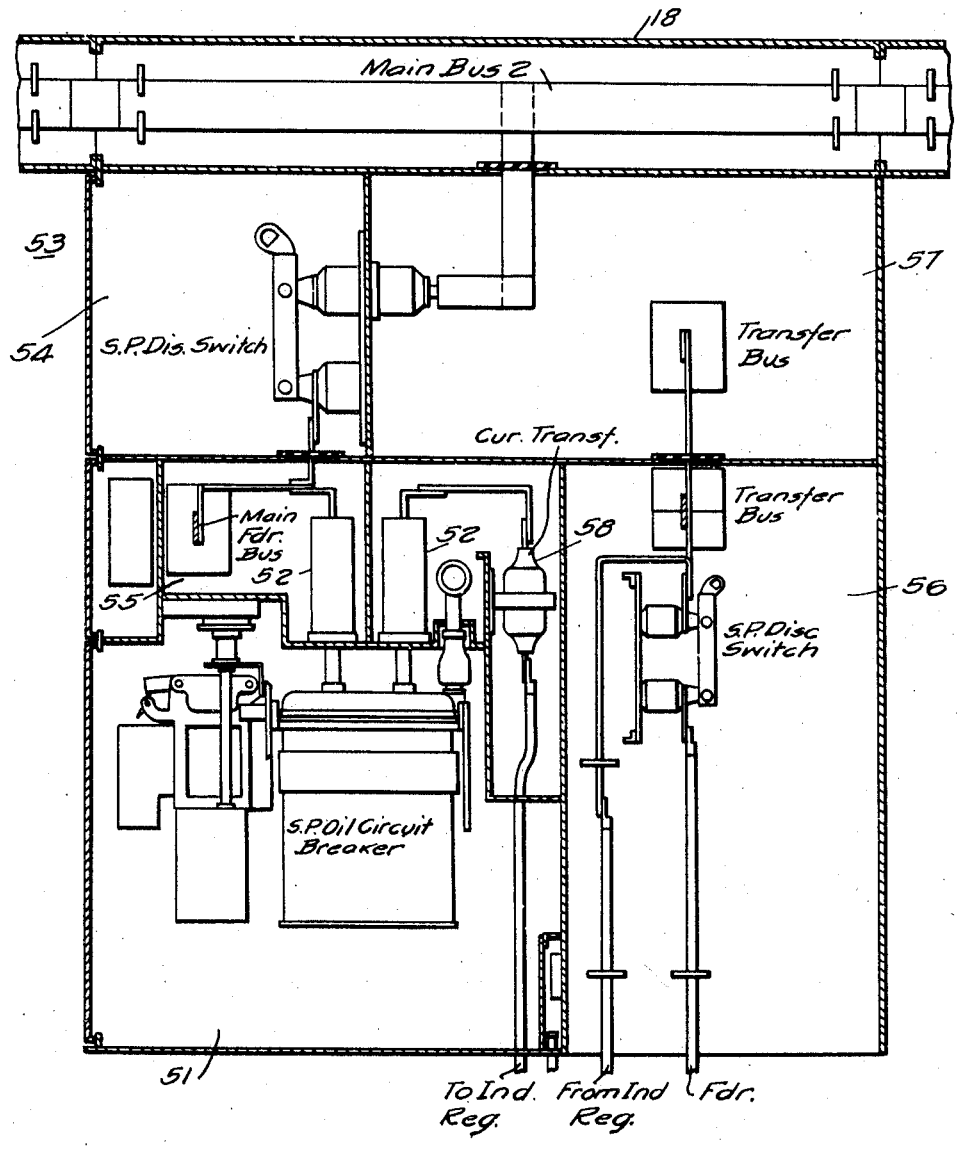
Fig. 4 is an enlarged view, in section, taken along the line IV—IV of Fig. 2 and illustrating one of the feeder breaker units.

The structure shown in Fig. 4 is typical for all of the feeder switchgear units. However, the superstructure and bus run is provided only on units 3a, 3b and 3c, and 4a, 4b and 4c. The structure shown in Fig. 4 comprises a single pole oil circuit breaker which is disposed in a compartment 51 and may be of the vertical lift type having primary disconnect contacts 52 for disconnecting the breaker from the bus structure which is enclosed in a superstructure 53 supported by the housing for the breaker. A single pole disconnect switch is disposed in a compartment 54 of the superstructure for connecting the circuit breaker to the main bus enclosed in the housing 18. The main feeder bus which is disposed in a compartment 55 of the housing for the breaker unit is also connected to the main bus by means of the single pole disconnect switch in the compartment 54.

As shown in Figs. 4 and 5, a pair of single pole disconnect switches are disposed in a compartment 56 at the rear of the breaker compartment 51. The upper terminal of one of these single pole disconnect switches is connected to a conductor coming from an induction regulator. The upper terminal of the other single pole disconnect switch is connected to the transfer bus. The lower terminals of these two disconnect switches may be connected together and in turn connected to a feeder conductor.

As explained hereinbefore, the portion of the transfer bus which is disposed in a compartment 57 of the superstructure extends between the units 3b and 4b through a housing 19. As shown in Fig. 3, the transfer bus for phases A and C extends through the units 7 and 8, respectively, and is disposed in the rear compartment 47 of the switchgear units. In this manner, the transfer bus for each phase is continuous throughout all of the units for each phase.

By referring to the diagram in Fig. 1 and the structure shown in Figs. 4 and 5, it will be seen that each phase of one of the main buses is connected to the corresponding main feeder bus through the single pole disconnect switch in the superstructure 53 and also to one terminal of the single pole circuit breaker unit. The other terminal of the circuit breaker unit is connected to an induction regulator through a current transformer 58. The induction regulator is connected to the one terminal of one of the pair of single pole disconnect switches disposed in the compartment 56 and the one terminal of the other disconnect switch is connected to the transfer bus. The lower terminals of these two disconnect switches are connected together and to a feeder conductor. In this manner, the feeder conductor may be supplied from either the transfer bus or the main feeder bus.

The switchgear units for the circuit breakers which connect the main feeder bus for each phase to the transfer bus for that phase through an induction regulator are similar to the structure illustrated in Fig. 4. As shown in Fig. 5 and indicated in the diagram in Fig. 1, a fixed connection 36 may be provided in place of one of the single pole disconnect switches for connecting to the transfer bus. Thus, the conductor from the induction regulator is connected to the upper terminal of one of the disconnect switches in the manner hereinbefore described and the lower terminal of this switch is connected to the fixed conductor 36, thereby providing a means for connecting the induction regulator to the transfer bus. In this manner, the transfer bus is energized through an induction regulator thereby maintaining a regulated voltage on the feeder circuits when they are connected to the transfer bus in place of the main feeder buses.

In order to conserve the floor space required for housing the switchgear equipment, the induction feeder regulators are preferably located in the basement of the building housing the switchgear structure. Thus each group of feeder regulators may be located directly underneath the corresponding groups of switchgear units and connected to the proper units by means of conductors through the floor, as indicated in the drawings. The conductors for the incoming lines are also preferably brought into the incoming line switchgear units through the floor, as indicated in the drawings. However, if desired, the induction regulators may be of the weatherproof type and installed in an outdoor switchyard.

It is apparent from the foregoing description that the compact arrangement of the switchgear units effects a considerable saving in the space required for housing the equipment. Furthermore, the feeder units are arranged to permit removal of the circuit breakers and to make all the equipment accessible for maintenance purposes and provide flexibility as to manual or automatic control. The present arrangement provides the maximum continuity of energy to all feeders in each phase group and incorporates all the features and advantages, including safety, of metal-clad switchgear. As explained hereinbefore, the amount of floor space required for housing the equipment is considerably reduced as compared with prior switchgear structures.

If desired, the selector disconnect switches which are located at the rear of the single-pole breaker units may be operated from the front of the breaker compartment by a system of levers. Also, the selector switches may be located in compartments at the side of their associated breaker unit, thereby making them accessible from the front of the cell structure, instead of from the rear, as shown.

Since many modifications may be made in the apparatus and arrangement of parts without departing from the spirit of my invention, I do not wish to be limited other than by the scope of the appended claims.

I claim as my invention:

1. In metal-clad switchgear, in combination, a three-phase main bus, a housing enclosing said bus, an incoming line circuit breaker disposed at each end of said bus, metal enclosures for said breakers, three single-phase buses extending transversely to the main bus, a separate housing for each single-phase bus, the housings for two of the single-phase buses extending from said breaker enclosures, switching means for connecting each single-phase bus to one phase of the main bus, a transfer bus for each phase of the main bus, said transfer buses being disposed in generally parallel relation to the single-phase buses, and switching means for connecting each transfer bus to the single-phase bus of the corresponding phase.

2. In a metal-clad switchgear, in combination, a three-phase main bus, a housing enclosing said bus, an incoming line circuit breaker disposed at each end of said bus, metal enclosures for said breakers, three single-phase buses extending at right angles to the main bus, a separate housing for each single-phase bus, the housings for two of the single-phase buses extending from said breaker enclosures, switching means for connecting each single-phase bus to one phase of the main bus, a transfer bus for each phase of the main bus, said transfer buses being disposed in generally parallel relation to the single-phase buses, switching means for connecting each transfer bus to the single-phase bus of the corresponding phase, and metal enclosures for said switching means.

3. In metal-clad switchgear, in combination, a horizontally disposed three-phase main bus, a housing enclosing said bus, a circuit breaker for connecting a power line to each end of said bus, metal enclosures for said breakers, three horizontally disposed single-phase buses extending transversely to the main bus, a separate housing for each single-phase bus, the housings for two of the single-phase buses extending from said breaker enclosures, switching means for connecting each single-phase bus to one phase of the main bus, a transfer bus for each phase of the main bus, said transfer buses being disposed in generally parallel relation to the single phase buses, switching means for connecting each transfer bus to the single-phase bus of the corresponding phase, a plurality of feeder circuits for each phase, and switching means for selectively connecting each feeder circuit for one phase to either the single-phase bus or the transfer bus for that phase.

4. In metal-clad switchgear, in combination, a horizontally disposed three-phase main bus, a housing enclosing said bus, a circuit breaker for connecting a power line to each end of said bus, metal enclosures for said breakers, three horizontally disposed single-phase buses extending transversely to the main bus, a separate housing for each single-phase bus, the housings for two of the single-phase buses extending from said breaker enclosures, switching means for connecting each single-phase bus to one phase of the main bus, a transfer bus for each phase of the main bus, said transfer buses being disposed in generally parallel relation to the single-phase buses, switching means for connecting each transfer bus to the single-phase bus of the corresponding phase, a plurality of feeder circuits for each phase, and switching means for selectively connecting each feeder circuit for one phase to either the single-phase bus or the transfer bus for that phase, and metal enclosures for said switching means.

5. In metal-clad switchgear, in combination, a horizontally disposed three-phase main bus, a housing enclosing said bus, a circuit breaker for connecting a power line to each end of said bus, metal enclosures for said breakers, three horizontally disposed single-phase buses extending at right-angles to the main bus, a separate housing for each single-phase bus, the housings for two of the single-phase buses extending from said breaker enclosures, switching means for connecting each single-phase bus to one phase of the main bus, a transfer bus for each phase of the main bus, said transfer buses being disposed parallel to the single-phase buses, switching means for connecting each transfer bus to the single-phase bus of the corresponding phase, a plurality of feeder circuits for each phase, and switching means for selectively connecting each feeder circuit for one phase to either the single-phase bus or the transfer bus for that phase, and metal enclosures for said switching means, said transfer buses being isolated from said single-phase buses by said metal enclosures.

6. In metal-clad switchgear, in combination, a pair of horizontally disposed three-phase main buses, switching means for connecting said buses together to form a closed loop, separate housings for enclosing each of said three-phase buses, three horizontally disposed single-phase buses extending in predetermined angular relation to the main buses, each single-phase bus being divided into two sections extending in opposite directions from the main buses, a separate housing for each section of the single-phase buses, switching means for connecting each phase of one of the main buses to the corresponding phase of one section of the single-phase buses, and metal enclosures for said switching means.

7. In metal-clad switchgear, in combination, a pair of horizontally disposed three-phase main buses, switching means for connecting said buses together to form a closed loop, separate housings for enclosing each of said three-phase buses, three horizontally disposed single-phase buses extending at right angles to the main buses, each single-phase bus being divided into two sections extending in opposite directions from the main buses, a separate housing for each section of the single-phase buses, switching means for connecting each phase of one of the main buses to the corresponding phase of one section of the single-phase buses, a transfer bus for each phase of the main buses, said transfer buses being disposed parallel to the single-phase buses, additional switching means for connecting each transfer bus to its respective phase, and metal enclosures for said switching means.

8. In metal-clad switchgear, in combination, a pair of horizontally disposed three-phase main buses, switching means for connecting said buses together to form a closed loop, separate housings for enclosing each of said three-phase buses, three horizontally disposed single phase buses extending at right angles to the main buses, each single-phase bus being divided into two sections extending in opposite directions from the main buses, a separate housing for each section of the single-phase buses, switching means for connecting each phase of one of the main buses to the corresponding phase of one section of the single-phase buses, a transfer bus for each phase of the main buses, said transfer buses being disposed parallel to the single-phase buses, additional switching means for connecting each transfer bus to its respective phase, a plurality of feeder circuits for each phase, and switching means for selectively connecting each feeder circuit for one phase to either one section of the single-phase bus or the transfer bus for that phase.

9. In metal-clad switchgear, in combination, a pair of horizontally disposed three-phase main buses, switching means for connecting said buses together to form a closed loop, separate housings for enclosing each of said three-phase buses, three horizontally disposed single-phase buses extending at right angles to the main buses, each single-phase bus being divided into two sections extending in opposite directions from the main buses, a separate housing for each section of the single-phase buses, switching means for connecting each phase of one of the main buses to the corresponding phase of one section of the single-phase buses, a transfer bus for each phase of the main buses, said transfer buses being disposed parallel to the single-phase buses, additional switching means for connecting each transfer bus to its respective phase, a plurality of feeder circuits for each phase, switching means for selectively connecting each feeder circuit for one phase to either one section of the single-phase bus or the transfer bus for that phase, and metal enclosures for said switching means.

10. In metal-clad switchgear, in combination, a pair of horizontally disposed three-phase main buses, switching means for connecting said buses together to form a closed loop, separate housings for enclosing each of said three-phase buses, three horizontally disposed single phase buses extending at right angles to the main buses, each single-phase bus being divided into two sections extending in opposite directions from the main buses, a separate housing for each section of the single phase buses, switching means for connecting each phase of one of the main buses to the corresponding phase of one section of the single-phase buses, a transfer bus for each phase of the main buses, said transfer buses being disposed parallel to the single-phase buses, additional switching means for connecting each transfer bus to its respective phase, a plurality of feeder circuits for each phase, and switching means for selectively connecting each feeder circuit for one phase to either one section of the single-phase bus or the transfer bus for that phase, and metal enclosures for said switching means, said transfer buses being isolated from said single-phase buses by said metal enclosures.

11. In metal-clad switchgear, in combination, a pair of horizontally disposed three-phase main buses, switching means for connecting said buses together to form a closed loop, separate housings for enclosing each of said three-phase buses, three groups of metal-enclosed switchgear units extending in opposite directions from the main buses in predetermined angular relation to the main buses, each group comprising a plurality of structurally separate adjacently disposed housings containing a single-phase feeder bus and a transfer bus, a plurality of feeder circuits for each group, and switching means for selectively connecting each feeder circuit to either the feeder bus or the transfer bus.

12. In metal-clad switchgear, in combination, a pair of horizontally disposed three-phase main buses, switching means for connecting said buses together to form a closed loop, separate housings for enclosing each of said three-phase buses, a plurality of groups of metal-enclosed switchgear units disposed on opposite sides of the main buses and extending in opposite directions from the main buses transversely to said buses, each group comprising a plurality of structurally separate adjacently disposed housings containing a single-phase feeder bus and a transfer bus, a plurality of feeder circuits for each group, and switching means for selectively connecting each feeder circuit to either the feeder bus or the transfer bus.

13. In metal clad switchgear, in combination, a pair of horizontally disposed three-phase main buses, switching means for connecting said buses together to form a closed loop, separate housings for enclosing each of said three-phase buses, a plurality of segregated groups of metal-enclosed switchgear units disposed on opposite sides of the main buses and extending in opposite directions from the main buses at right angles to said buses, each group comprising a plurality of structurally separate adjacently disposed housings containing a single-phase feeder bus and a transfer bus disposed in separate compartments of said housings, a plurality of feeder circuits for each group, and switching means for selectively connecting each feeder circuit to either the feeder bus or the transfer bus.

14. In metal-clad switchgear, in combination, a pair of horizontally disposed three-phase main buses, switching means for connecting said buses together to form a closed loop, separate housings for enclosing each of said three-phase buses, a plurality of segregated groups of metal-enclosed switchgear units disposed on opposite sides of the main buses and extending in opposite directions from the main buses at right angles to said buses, each group comprising a plurality of structurally separate adjacently disposed housings containing a single-phase feeder bus and a transfer bus disposed in separate compartments of said housings, a plurality of feeder circuits for each group, and switching means including an automatic circuit breaker and independently operable disconnect switches for selectively connecting each feeder circuit to either the feeder bus or the transfer bus.

15. In metal-clad switchgear, in combination, a pair of horizontally disposed three-phase main buses, switching means for connecting said buses together to form a closed loop, separate housings for enclosing each of said three-phase buses, a plurality of segregated groups of metal-enclosed switchgear units disposed on opposite sides of the main buses and extending in opposite directions from the main buses at right angles to said buses, each group comprising a plurality of structurally separate adjacently disposed housings containing a single-phase feeder bus and a transfer bus disposed in separate compartments of said housings, a plurality of feeder circuits for each group, and switching means including an automatic circuit breaker and independently operable disconnect switches for selectively connecting each feeder circuit to either the feeder bus or the transfer bus, each circuit breaker and its associated disconnect switches being disposed in separate compartments of one of said housings.

GLEN L. CLAYBOURN.